UNITED STATES PATENT OFFICE.

N. PETRE, OF NEW YORK, N. Y.

IMPROVED MEDICINE.

Specification forming part of Letters Patent No. 57,561, dated August 28, 1866.

*To all whom it may concern:*

Be it known that I, N. PETRE, of the city, county, and State of New York, have invented a new and Improved Medical Compound; and I do hereby declare that the following is a full, clear, and exact description thereof, which will enable those skilled in the art to make and use the same.

The object of this improved compound is to provide a safe and useful remedy for several classes of diseases—namely, general debility, fever and ague, weakness of the stomach, indigestion, laxity of the intestines, fluxes, colic, dyspepsia, cholera morbus, and other diseases hereinafter mentioned.

My improved medical compound I prepare as follows: I take one part of the ordinary tincture of laudanum as commonly made by druggists, three parts of the ordinary tincture of paregoric, and four parts of the ordinary tincture of myrrh, and mix them well together, and when mixed my composition is ready for use.

My composition is to be employed in the following manner, in doses of from one to three spoonfuls once in twenty-four hours, and in some cases more frequently: For cough and cold, consumption, whooping-cough, and all complaints arising from the chest or lungs, I give the dose in the yelk of eggs with sugar; for children troubled with worms, I give the dose in molasses; for scrofula, piles, and several other external diseases, I apply the composition in the form of an ointment made with fresh butter; for rheumatism, burns, bruises, weak and inflamed eyes, and all external injuries, I use the compound unmixed, or place it in a small quantity of brandy, whisky, or gin; for all kinds of venereal diseases the composition may be used as an injection with water, or apply the composition externally without water.

I claim as new and desire to secure by Letters Patent—

The within-described medical composition, made of the ingredients in the manner and proportion as set forth.

The above specification of my invention signed by me this 12th day of July, 1866.

N. PETRE.

Witnesses:
WM. F. MCNAMARA,
ALEX. F. ROBERTS.